United States Patent [19]

Blake et al.

[11] Patent Number: 4,901,586
[45] Date of Patent: Feb. 20, 1990

[54] ELECTROSTATICALLY DRIVEN DUAL VIBRATING BEAM FORCE TRANSDUCER

[75] Inventors: Graeme A. Blake, Bellevue; Brian L. Norling, Mill Creek, both of Wash.

[73] Assignee: Sundstrand Data Control, Inc., Redmond, Wash.

[21] Appl. No.: 316,899

[22] Filed: Feb. 27, 1989

[51] Int. Cl.$^4$ .................................................. G01L 1/10
[52] U.S. Cl. ............................ 73/862.59; 73/517 AV; 73/DIG. 1
[58] Field of Search ............. 73/862.59, 517 AV, 702, 73/704, 778, DIG. 1

[56] References Cited

U.S. PATENT DOCUMENTS

| | | | |
|---|---|---|---|
| 3,505,866 | 4/1970 | Welsbord et al. | 73/DIG. 1 |
| 3,745,384 | 7/1973 | Blanchard | 73/702 X |
| 4,215,570 | 8/1980 | EerNisse . | |
| 4,299,122 | 11/1981 | Ueda et al. | 73/862.59 |
| 4,372,173 | 2/1983 | EerNisse et al. . | |
| 4,467,651 | 8/1984 | Peters et al. . | |

Primary Examiner—Charles A. Ruehl
Attorney, Agent, or Firm—Michael S. Yatsko; Trevor B. Joike

[57] ABSTRACT

A dual vibrating beam force transducer having an electrostatic drive system. The transducer comprises a body having first and second generally parallel beams, coupled together at their ends. First and second electrodes are positioned adjacent to but not in contact with the respective beams. A drive circuit causes an oscillating voltage to be applied to the electrodes. The beams are thus subjected to electrostatic forces that cause the beams to oscillate in a vibration plane containing both beams. The mechanical resonance of the beams controls the oscillation frequency, such that the frequency is a function of a force exerted along the beams. An embodiment is also described in which the drive means is coupled directly to one of the beams.

6 Claims, 3 Drawing Sheets

ELECTROSTATICALLY DRIVEN DUAL VIBRATING BEAM FORCE TRANSDUCER

FIELD OF THE INVENTION

The present invention relates to force transducers and, in particular, to a force transducer having a pair of mechanically coupled vibrating beams.

BACKGROUND OF THE INVENTION

Dual vibrating beam force transducers, similar to those described in U.S. Pat. Nos. 4,372,173 and 4,724,351, have found use in many devices, including accelerometers, pressure transducers and scales. The transducers generally have the form of a double-ended tuning fork, with a pair of beams extending between a pair of common mounting pads. When used in an accelerometer, for example, the acceleration is converted into a tensile or compression force along the axis of the beams, producing a change in the resonant frequency of the vibrating beams. The frequency change is used as a measure of the acceleration.

Dual vibrating beam force transducers are usually made from crystalline quartz, a feature that allows the transducer to be driven piezoelectrically. However, when the transducer is made from a nonpiezoelectric material, such as silicon, the resonator must be driven by some other means. U.K. Patent No. 2,162,314 describes a miniature double-ended tuning fork transducer that is thermally driven. However, the frequency at which such a transducer can be driven is inherently limited by the thermal time constants involved.

SUMMARY OF THE INVENTION

The present invention provides a dual vibrating beam force transducer that includes an electrostatic drive system, to thereby permit the transducer to be driven over a wide range of drive frequencies. In a preferred embodiment, the transducer comprises a body having first and second generally parallel beams, coupled together at their ends. First and second electrodes are positioned adjacent to but not in contact with the respective beams. A drive means is electrically coupled to the electrodes, and causes an oscillating voltage to be applied to the electrodes. The beams are thus subjected to electrostatic forces that cause the beams to oscillate 180° out of phase with one another, in a vibration plane containing both beams. The mechanical resonance of the beams controls the frequency of the drive circuit/electrode/beam combination, such that the vibration frequency is a function of the tension or compression force exerted along the beams. The electrodes may lie in the plane of the beams, such that when the transducer is used in a micromachined device, the beams and electrodes can be etched from a single crystalline layer. An embodiment is also described in which the drive means is coupled directly to one of the beams.

DETAILED DESCRIPTION OF THE INVENTION

Figure 1:
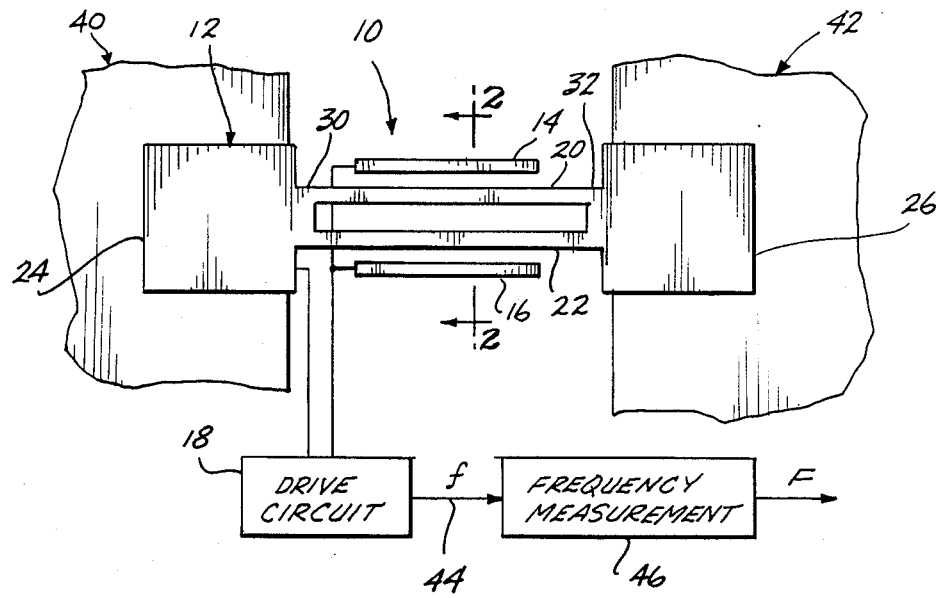
FIG. 1 is a schematic view of a first preferred embodiment of the invention.
Figure 2:
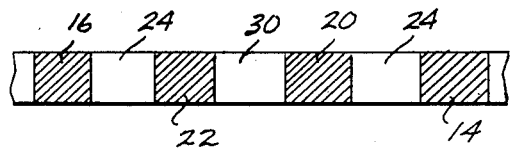
FIG. 2 is a cross-sectional view taken along the line 2—2 of FIG. 1.

A first preferred embodiment of the force transducer of the present invention is illustrated in FIGS. 1 and 2. The transducer 10 comprises a body 12 having a double-ended tuning fork configuration, a pair of electrodes 14 and 16, and a drive circuit 18 electrically coupled to the electrodes and the body. Body 12 comprises generally parallel beams 20 and 22 connected at their ends to mounting pads 24 and 26 through outrigger sections 30 and 32 respectively. Body 12 may comprise either a conductive material such as a metal, or a dielectric material such as silicon.

Mounting pads 24 and 26 are connected to structures 40 and 42, respectively, such that the structures can apply a compression or tension force directed along the lengthwise axes of beams 20 and 22. Drive circuit 18, described in greater detail below, causes an oscillating voltage to be applied to electrodes 14 and 16. When the electrodes have a voltage applied to them, they cause movement of charge (in the case of a conductive body 12) or the polarization of charge (in the case of a dielectric body 12) within beams 20 and 22, resulting in an attractive force between electrode 14 and beam 20, and an attractive force between electrode 16 and beam 22. These attractive forces are created regardless of whether the electrodes are charged positively or negatively with respect to body 12. Thus an oscillating voltage of frequency f applied to the electrodes would cause beams 20 and 22 to vibrate at frequency 2f, towards and away from one another, 180° out-of-phase. A bias voltage greater than the peaks of the oscillating voltage is therefore added to the oscillating voltage so that the beams 20 and 22 vibrate at the frequency f. This is generally the preferred resonance mode for a double-ended tuning fork transducer, because stresses coupled into outriggers 30 and 32 and mounting pads 24 and 26 tend to cancel, resulting in little loss of mechanical energy to structures 40 and 42.

Drive circuit 18 and elecrodes 14 and 16, in combination with beams 20 and 22, form an oscillator that oscillates at frequency f, the frequency of oscillation being controlled by the mechanical resonance of beams 20 and 22 at frequency 2f. Thus axial forces directed along the beams by structures 40 and 42 change the resonant frequency 2f, and thereby provide a measure of the force exerted by the structures on body 12. Drive circuit 18 produces an output signal on line 44 at frequency f, and this frequency is converted into a measure of force by frequency measurement circuit 46.

Figure 3:
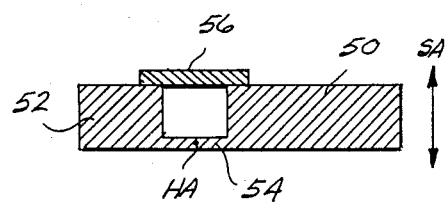
FIG. 3 is a schematic view showing the use of the force transducer in a micromachined accelerometer.

FIG. 3 schematically illustrates the use of transducer 10 in an accelerometer. The accelerometer shown in FIG. 3 includes proof mass 50 coupled to support 52 by flexure 54. Flexure 54 permits proof mass 50 to rotate, with respect to support 52, about hinge axis HA that passes through the flexure, normal to the plane of the drawing in FIG. 3. Force transducer 56 of the present invention is connected between proof mass 50 and support 52 adjacent to hinge axis HA. Thus an acceleration along sensitive axis SA causes proof mass 50 to rotate about the hinge axis, resulting in either a compression or tension force on force transducer 56. For a micromachined accelerometer formed from silicon, force transducer 56, and the associated electrodes shown in FIG. 1, may be formed by the etching of an epitaxial layer created on the upper surface of a silicon wafer. In a similar manner, flexure 54 can be formed by creating an epitaxial layer on the lower wafer surface, and using such layer as an electrochemical etch stop.

Figure 4:
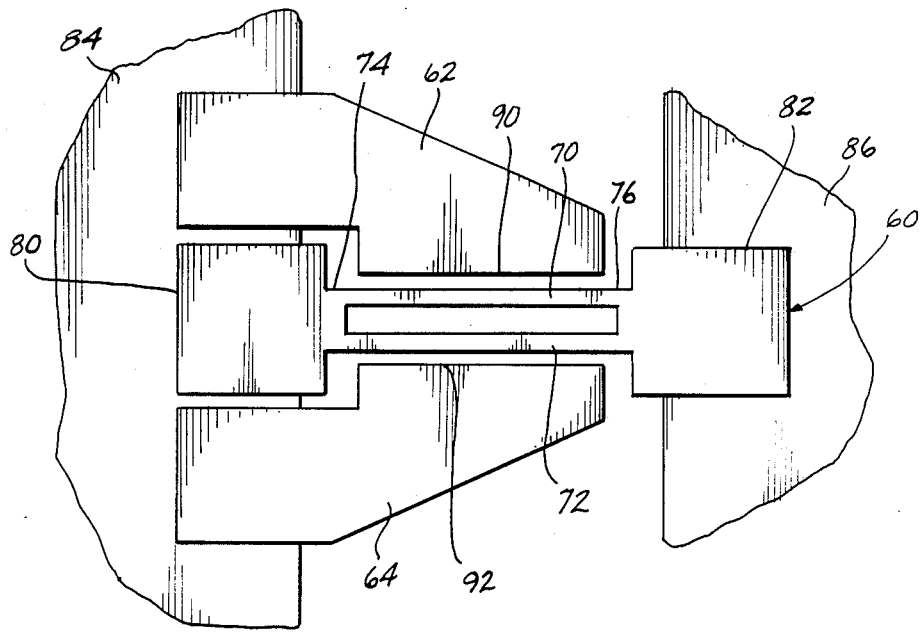
FIG. 4 is a schematic view of a second preferred embodiment of the invention.

A second preferred embodiment of the force transducer of the present invention is shown in FIG. 4. The transducer comprises body 60 and electrodes 62 and 64. Body 60 has a double-ended tuning fork configuration, and includes beams 70 and 72 coupled together at their ends by outriggers 74 and 76 and respective mounting pads 80 and 82. Mounting pad 80 is connected to structure 84 that may comprise an accelerometer support member, while mounting pad 82 is attached to structure 86 that may comprise an accelerometer proof mass. Electrodes 62 and 64 are also attached to structure 84, and are cantilevered outward from the structure, such that electrode edges 90 and 92 are positioned adjacent to the outwardly facing surfaces of beams 70 and 72, respectively.

The cantilevered support for electrodes 62 and 64 makes it unnecessary for the electrodes to be attached to proof mass 86, thereby avoiding interference with proof mass movement. The electrodes are coupled to a drive circuit, as shown in FIG. 1. In a silicon micromachined device, body 60 and electrodes 62 and 64 are preferably formed from a single epitaxial layer grown on the surface of a silicon wafer, with structures 84 and 86 being formed from the original wafer material. For example, a P-type wafer can be used to form structures 84 and 86, and an N-doped epitaxial layer can be used to form body 60 and electrodes 60 and 62. The coplanar design shown in FIG. 4 is preferred, since it permits both the electrodes and the double-ended tuning fork body to be fabricated simultaneously from a single layer.

Figure 5:
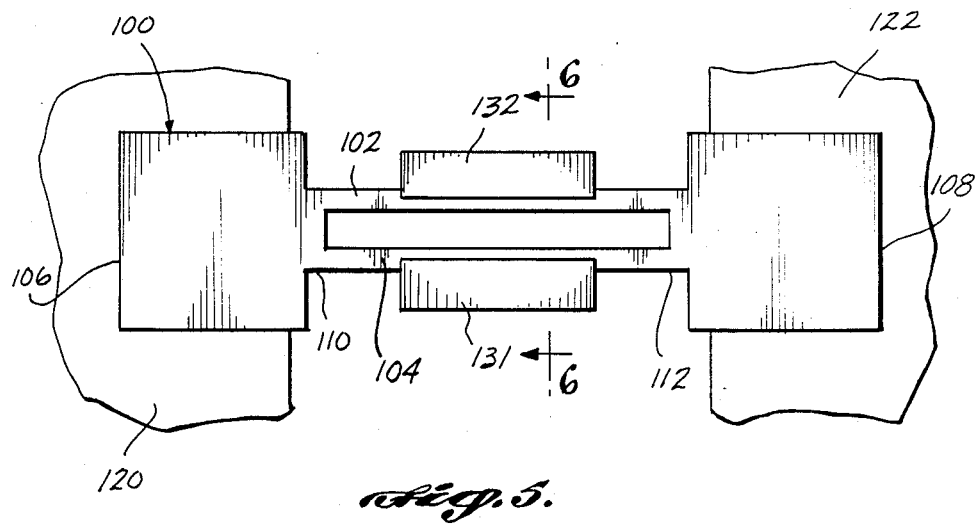
FIG. 5 is a schematic view of a third preferred embodiment of the invention.
Figure 6:
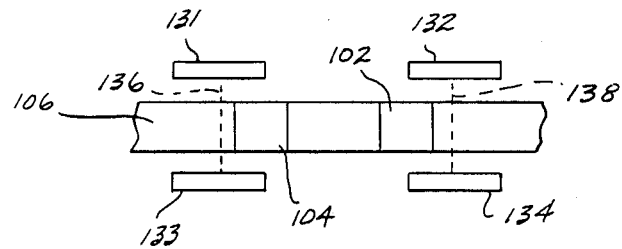
FIG. 6 is a cross-sectional view taken along line 6—6 of FIG. 5.

A third preferred embodiment of the invention is shown in FIGS. 5 and 6. The transducer comprises double-ended tuning fork body 100 that may be identical to body 12 shown in FIG. 1. Body 100 comprises beams 102 and 104 connected between mounting pads 106 and 108 via outriggers 110 and 112, respectively. Mounting pads 106 and 108 are connected to structures 120 and 122, respectively. A total of four electrodes 131–134 are positioned about beams 102 and 104. Electrodes 131 and 133 are positioned above and below beam 104, and are spaced outwardly from beam 104, such that the beam is positioned inwardly with respect to line 136 that is drawn between the centers of electrodes 131 and 133. Beam 102 is similarly positioned such that it is positioned inwardly with respect to line 138 that is drawn between the centers of electrodes 132 and 134. All electrodes are connected to receive a common drive voltage from the drive circuit.

When a voltage is applied to electrodes 131–134, beams 102 and 104 are pulled outwardly, away from one another, towards lines 136 and 138 respectively. In effect, the electrostatic forces between the electrodes and beams cause each beam to attempt to position itself centrally between the adjacent elecrode pair. Thus this arrangement produces beam driving forces that are contained entirely within the plane of body 100, as with the embodiments shown in FIG. 4. Electrodes 131–134 may be supported by extending them outwardly from the beams and towards mounting structure 120, in the manner generally similar to that shown in FIG. 4. For this embodiment, a total of five layers are required to form the body/electrode structure: one layer for body 100, two layers for the electrodes, and two sacrificial layers between the electrodes and body 100, to position the electrodes spaced from the beams.

The arrangement shwon in FIGS. 5 and 6 may be modified by eliminating electrodes 133 and 134. A periodic voltage on the remaining electrodes 131 and 132 still produces a periodic driving force in the plane of the body, but it also produces a transverse periodic force which may excite spurious modes in the beams. However it will often be possible to design the transducers such that the frequencies of such spurious modes are outside the bandwidth of the desired mode. The spurious modes can then be avoided by suitable design of the drive circuit.

Figure 7:
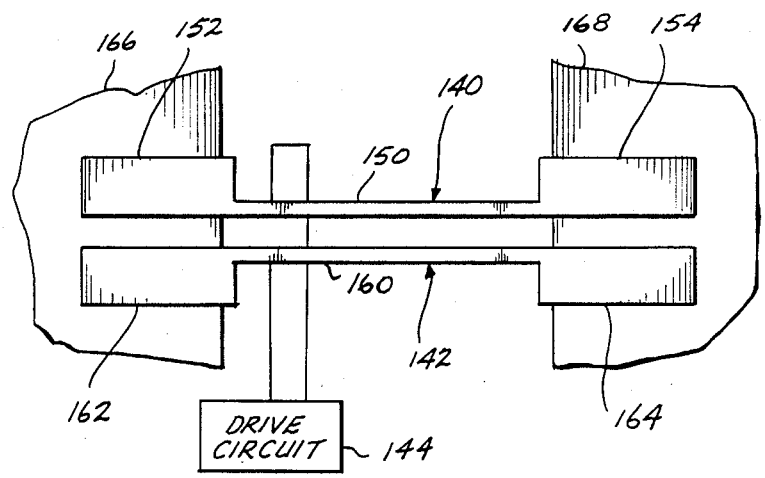
FIG. 7 is a schematic view of a fourth preferred embodiment of the invention.

FIG. 7 illustrates a further embodiment of the invention, in which the electrostatic force driving the beams is created by applying a voltage directly to one of the beams. The embodiments as shown in FIG. 7 includes identical bodies 140 and 142 and drive circuit 144. Body 140 includes beam 150 that extends between mounting pads 152 and 154, while body 142 comprises beam 160 that extends between mounting pads 162 and 164. Mounting pads 152 and 162 are connected to structure 166, while mounting pads 154 and 164 are connected to a second structure 168. Bodies 140 and 142 are aligned such that beams 150 and 160 are parallel to one another, and spaced apart from one another by a small gap.

In the illustrated embodiment, body 140 is grounded, and body 142 is connected to drive circuit 144, for receiving a periodic voltage from the drive circuit. Such voltage causes a periodic attraction between the beams that drives them into resonance, in a manner similar to those of the embodiments described above. The very narrow beam spacing allowed by micromachining processes (e.g., focused ion beam milling), and the fact that both transducer beams are integrally connected to the same structures, means that much of the advantage of having the beams connected directly to one another via outriggers and mounting pads are retained. The closeness of the beams required to get good cancellation of torques at the beam ends also has the effect of allowing one to generate a large driving force with a low driving voltage.

Figure 8:
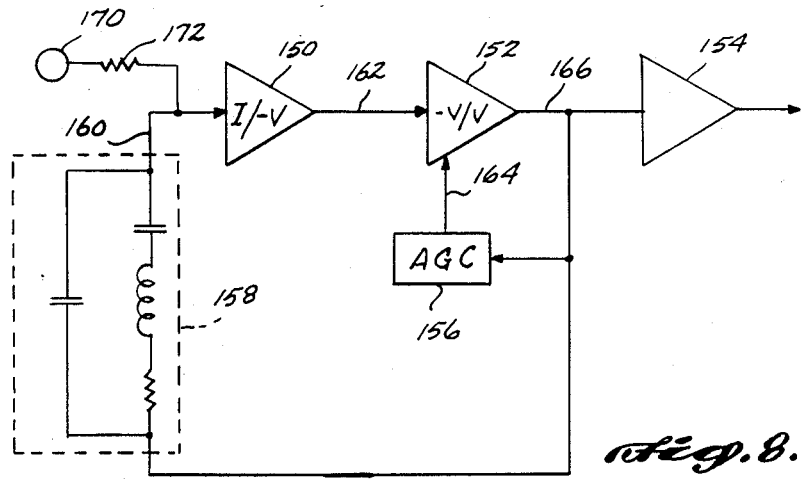
FIG. 8 is a circuit diagram of a drive circuit.

A suitable embodiment for the drive circuit of the present invnvention is shown in FIG. 8. The drive circuit includes amplifiers 150 and 152, output buffer 154, and automatic gain control (AGC) circuit 156. In FIG. 8, the resonating structure is represented in block 158 by a series combination of a capacitor, an inductor and a resistor, shunted by a capacitor. The electrodes are coupled to the input terminal of amplifier 150 by line 160, amplifier 150 operating as a current-to-voltage converter, with the output voltage being out-of-phase with the input current. Amplifier 150 sums a bias current from a steady voltage source 170 and resistor 172 with the current from block 158. The output of amplifier 150 is coupled to the input of amplifier 152, which operates as a variable gain voltage inverter, the amount of the gain being controlled by a control signal on line 164 from the AGC circuit. The ouput of amplifier 152 on line 166 is connected to output buffer 154, and is fed back to resonating structure 158.

For all of the embodiments described above, the drive can be provided at a much higher frequency than could a thermal drive. The electric field created by the electrostatic drive is highly confined to the space between the electrodes and beams, so that extensive shielding is not required. A person skilled in the art can, of course, produce other drive arrangements that are modifications of the embodiments presented. For example, the electrode and beam may be given like charges, in which case the driving force will be repulsive rather than attractive. The disadvantage of repulsive arrangements is that they produce more leakage of fields than in the attractive case. The roles of the beams and electrode may be reversed, either in the sense of physical positioning, such as placing the beams to the outside of a drive electrode, or in the sense of materials, such as making the transducer body and beams from a conductor, and the electrodes from a dielectric material. For all embodiments, the electrode shape and size may be adjusted to optimize driving the desired resonant mode. In addition, separate drive and sense electrodes may be provided, rather than combining both functions into a single electrode as in the described embodiments; for example, in FIG. 1, each of electrodes 14 and 16 could be divided lengthwise into a central portion comprising a drive electrode and interconnected end portions comprising sense electrodes. Referring to FIG. 8, the drive electrodes would be connected to line 166, while the sense electrodes would be connected to line 160.

The embodiments of the invention in which an exclusive property or privilege is claimed are defined as follows:

1. In a vibrating beam force transducer of the type comprising a body including first and second generally parallel beams coupled together at their ends, the improvement comprising first and second electrodes positioned adjacent to but not in contact with the first and second beams, respectively, and drive means electrically coupled to the electrodes for causing an oscillating voltage to be applied to the electrodes such that the beams are subjected to electrostatic forces that cause the beams to oscillate 180° out of phase with one another in a vibration plane containing both beams, whereby said oscillating voltage has a frequency that is a function of a force applied lengthwise along the beams.

2. The improvement of claim 1, wherein the electrodes lie in said vibration plane.

3. The improvement of claim 2, wherein each electrode is positioned on the opposite side of its associated beam from the other beam.

4. The improvement of claim 1, wherein each electrode comprises upper and lower electrode portions positioned on opposite sides of the associated beam in a direction normal to the vibration plane, the electrode portions being positioned such that the beam is not centered between the electrode portions, such that when a voltage is applied to the electrode portions, the beam is attracted towards a position centered between the electrode portions.

5. The improvement of claim 1, wherein said oscillating voltage includes a steady state component, whereby said frequency of the oscillating voltage is the same as a frequency of oscillation of the beams.

6. A vibrating beam force transducer for measuring a force exerted between the first and second structures, the transducer comprising first and second bodies, each body comprising a beam extending between first and second end sections, the bodies being positioned such that each body has one end section connected to each structure, and such that the beams are parallel and adjacent to one another but not in contact with one another, the transducer further comprising means for applying a periodic voltage to one of the bodies, to thereby produce a periodic electrostatic force between the beams to drive the beams into resonant vibration at a frequency that is a function of an axial force applied along the beams by the structures.

* * * * *